United States Patent Office 2,768,178
Patented Oct. 23, 1956

2,768,178
ENDRIN STABILIZATION USING INORGANIC AND ORGANIC NITRITE SALTS

Richard H. Bellin, Denver, Colo., assignor to Shell Development Company, New York, N. Y., a corporation of Delaware No Drawing. Application July 26, 1954,
Serial No. 445,932

11 Claims. (Cl. 260—348)

This invention pertains to a method for stabilizing epoxy-substituted octahydro-endo,endo-dimethanonaphthalene compounds containing halogen substituents. More particularly, the invention pertains to a method for stabilizing 6,7 - epoxy - 1,2,3,4,10,10 - hexachloro-1,4,4a,5,6,7,8,8a- octahydro-1,4,5,8- endo,endo-dimethanonaphthalene. The invention also pertains to the new and stable compositions which for the first time now are provided by the present invention.

Epoxy-substituted octahydro-endo,endo-dimethanonaphthalene compounds containing halogen substituents, such as 6,7- epoxy- 1,2,3,4,10,10- hexachloro- 1,4,4a,5,6,7,8,8a-octahydro-1,4,5,8-endo,endo-dimethanonaphthalene, have recently been made known and have been found to have considerable value as insecticides. Serious difficulties have been encountered in the production and use of these compounds, however, owing to their chemical instability. These difficulties have been particularly serious with 6,7-epoxy-1,2,3,4,10,10- hexachloro- 1,4,4a,5,6,7,8,8a- octahydro-1,4,5,8-endo,endo-dimethanonaphthalene. Like certain of their insecticidal properties, the chemical instability of these epoxy- and halogen-substituted octahydro-endo,endo-dimethanonaphthalene compounds appears to be attributable in large measure to their particular stereochemical configuration, and not merely to the nature of the substituent groups and atoms which are present. For example, under conditions where 6,7-epoxy-1,2,3,4,10,10-hexachloro-1,4,4a,5,6,7,8,8a-octahydro-1,4,5,8-endo,endo-dimethanonaphthalene undergoes irreversible, substantially complete conversion in but a few hours to products having little if any insecticidal activity, even as closely related a compound as 6,7-epoxy-1,2,3,4,10,10-hexachloro- 1,4,4a,5,6,7,8,8a- octahydro-1,4,5,8- endo,exo-dimethanonaphthalene has been found to be substantially stable.

It is therefore one of the principal objects of this invention to provide means for overcoming the observed chemical instability of the epoxy-substituted octahydro-endo,endo-dimethanonaphthalene compounds containing halogen substituents, especially of 6,7-epoxy-1,2,3,4,10,10-hexachloro-1,4,4a,5,6,7,8,8a-octahydro-1,4,5,8-endo,endo-dimethanonaphthalene, which at the present time is the most readily available of these compounds.

Other and more specific objects of the invention will be apparent from the accompanying disclosures and claims.

The chemical compound 6,7-epoxy-1,2,3,4,10,10-hexachloro- 1,4,4a,5,6,7,8,8a- octahydro- 1,4,5,8-endo,endo- dimethanonaphthalene is also known as the epoxide of the Diels-Alder adduct of 1,2,3,4,7,7 - hexachlorobicyclo-(2.2.1)-2,5-heptadiene and cyclopentadiene. When pure it is a white crystalline material melting with decomposition at about 245° C. It can be prepared by epoxidation of this Diels-Alder adduct using, for example, peracetic acid as the epoxidizing agent. The 1,2,3,4,7,7-hexachlorobicyclo(2.2.1)-2,5-heptadiene can be prepared in turn by dehydrochlorination of the Diels-Alder adduct of hexachlorocyclopentadiene and vinyl chloride, for example, by treatment with an alcoholic solution of a caustic alkali. The chemical structure of 6,7-epoxy-1,2,3,4,10,10-hexachloro- 1,4,4a,5,6,7,8,8a- octahydro- 1,4,5,8- endo,endo-dimethanonaphthalene can be represented in planar form by the structural formula

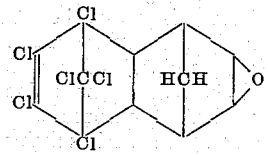

The geometrical configuration can be indicated by the following three-dimensional formula:

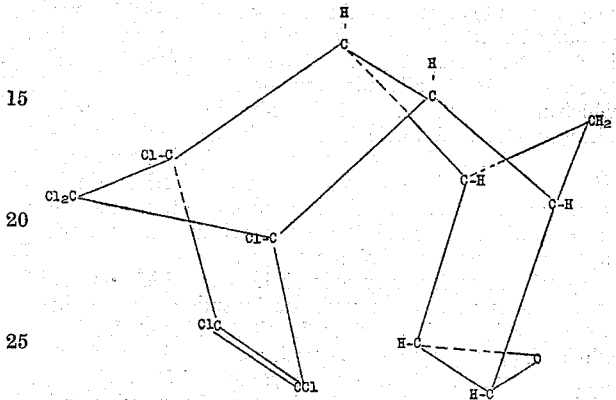

In other epoxy- and halogen-susbtituted octahydro-endo,endo-dimethanonapthalene compounds with which the invention is concerned, chlorine shown in the above formulas may be replaced by other halogens, for example bromine, and/or hydrogen shown in the formulas may be replaced by a substituent group, such as an alkyl group, an ester group, or an alkoxy group. In each case, however, there will be present the six halogen atoms on the one ring and the stereochemical configuration will be the illustrated endo-endo configuration.

When an epoxy- and halogen-substituted octahydro-endo,endo-dimethanonaphthalene compound, such as 6,7-epoxy-1,2,3,4,10,10- hexachloro- 1,4,4a,5,6,7,8,8a- octahydro- 1,4,5,8- endo,endo - dimethanonaphthalene is stored at ambient temperatures or heated for shorter periods of time at elevated temperatures it undergoes a chemical transition which essentially destroys the valuable insecticidal activity of the compound. This transition reaction has been found to occur even though the compound is in the crystalline form and therefore of a high degree of purity.

It now has been discovered in accordance with the present invention that this chemical transition can be prevented by incorporating with the epoxy- and halogen-substituted octahydro-endo,endo-dimethanonapthalene compound relatively small amounts of certain chemical additives and that in this manner a product of greatly improved stability can be obtained. These chemical additives which now have been found to act as stabilizers for the epoxy- and halogen-substituted octahydro-endo,endo-dimethanonaphthalene compounds are the nitrite salts; that is to say, the salts of nitrous acid.

For most effective stabilization, a nitrite salt is incorporated with the solid, usually crystalline, epoxy- and halogen-substituted octahydro-endo,endo-dimethanonaphthalene compound in such a manner that the nitrite salt is intimately and more or less uniformly distributed throughout the bulk of the material which is to be stabilized. This can be accomplished effectively by precipitating or crystallizing the epoxy- and halogen-substituted octahydro-endo,endo-dimethanonaphthalene compound from a solution containing a small amount of a soluble nitrite salt in solution therein, thereby occluding the nitrite salt within and among the solid particles or crystals of the epoxy- and halogen-substituted octahydro-endo,-endo-dimethanonaphthalene.

Nitrite salts which may be employed in accordance with the invention include not only such inorganic nitrites as potassium nitrite, sodium nitrite, lithium nitrite and nitrites of the alkaline earth metals, such as calcium nitrite, but also nitrite salts of the various organic bases, with special reference being made to the nitrite salts of amines. In particular, there may be employed organic base nitrite salts of the primary amines, of the secondary amines, of the tertiary amines, and also of the quaternary ammonium organic bases. Of the amine nitrites, those derived from the trivalent nitrogen compounds are in general preferred, and particularly suitable are the nitrite salts of the secondary amines.

The organic bases which, more generally considered, may be employed to form the organic nitrite salts that are employed in accordance with the invention may be acyclic in character or they may contain one or more cyclic structures, such as an alicyclic ring, or a heterocyclic ring which may or may not include within the ring the basic nitrogen atom. Suitable heterocyclic bases from which operable nitrite salts may be prepared for the purposes of the invention include, among others, piperidine, pyridine, morpholine, pyrrolidine, and the thiazolines, in each of which the nucleus may be substituted by alkyl, aryl, alkaryl or cycloaliphatic groups.

Specific examples of organic nitrite salts which may be employed in accordance with the invention include the primary amine nitrites, such as the nitrites of methylamine, ethylamine, isopropylamine, tertiarybutylamine and the various amyl, hexyl, heptyl, octyl and higher primary aliphatic amines; cyclopentylamine, cyclohexylamine and alkyl substitution products of the same, such as the monomethylcyclohexyl amines, the dimethylcyclohexyl amines and the trimethylcyclohexyl amines; aromatic amines, such as aniline, para-ethyl aniline, 2,4,6-trimethyl aniline, naphthylamine and their homologs and analogs. The primary amine may contain but one or it may contain more than one basic nitrogen atom. Examples of primary amines which contain more than one basic nitrogen atom include ethylene diamine, trimethylene diamine, propylene diamine and hexamethylene diamine.

The secondary amine, from which the preferred nitrite salts may be prepared, include the various dialkylamines as well as the amines in which the nitrogen atom is substituted by either one or two cyclic radicals, such as an alicyclic or an aromatic radical. Among the operable dialkylamines are included dimethylamine, diethylamine, dipropylamine, diisopropylamine, diamylamine, dioctylamine, and the various homologs and analogs of these specific dialkylamines. Secondary amines in which the amino nitrogen atom is substituted by from one to two cyclic groups include, among others, dicyclohexylamine, N-phenyl aniline, N-methyl aniline, phenylene diamine, N-octyl aniline, N-methylcyclohexylamine and their various homologs and analogs. The secondary amine may contain more than the one nitrogen atom, as is the case with such secondary amine bases as tetrahydro pyrimidine, 2,2,4,4,6-pentamethyl tetrahydro pyrimidine, diethylene triamine and triethylene tetramine.

Among the triamines which may be employed for preparing operable nitrite salts are the trialkylamines, such as trimethylamine, triethylamine, triisopropylamine, triamylamine and their homologs and analogs, as well as cyclic triamines, such as N,N-dimethyl aniline, N-ethyl piperidine, N-methyl dicyclohexylamine and triphenylamine. Guanidine nitrite and the nitrite salts of urea, thiourea and of the N-substituted ureas and thioureas also may be used.

Because of their effectiveness the nitrite salts of the secondary amines are particularly preferred and of these, the salts wherein the amine residue contains from about 4 to about 32 carbon atoms are particularly preferred.

The nitrite salts may be incorporated with the epoxy- and halogen-substituted octahydro-endo,endo-dimethano- naphthalene compound by any suitable method to provide the novel compositions of the invention. When the epoxy- and halogen-substituted octahydro-endo,endo-dimethanonaphthalene compound is at hand in the form of a solid, such as a flaked product or a crystalline material, the nitrite salt may be incorporated by dry mixing or by blending a solution of the nitrite salt in a volatile solvent with the solid epoxy- and halogen-substituted octahydro-endo,endo-dimethanonaphthalene compound and thereafter permitting the solvent to evaporate.

A particularly effective method which has been employed with advantage in the preparation of stable crystalline, 6,7 - epoxy - 1,2,3,4,10,10 - hexachloro-1,4,4a,5,6,7,8,8a - octahydro - 1,4,5,8 - endo,endo - dimethanonaphthalene (endrin), is to add a soluble nitrite salt to a solution of the epoxy- and halogen-substituted octahydro-endo,endo-dimethanonaphthalene compound in an organic solvent and to crystallize the epoxy- and halogen - substituted octahydro - endo,endo - dimethanonaphthalene compound from the solution containing the nitrite salt. It appears that the nitrite salt is occluded in the crystals of the epoxy- and halogen-substituted octahydro-endo,endo-dimethanonaphthalene compound and that the occlusion may account for the outstanding stabilities that have been obtained in this manner. The solvent may be, for example, benzene, toluene, carbon tetrachloride, isooctane or other inert volatile organic solvent for the epoxy- and halogen-substituted octahydro-endo,endo-dimethanonaphthalene compound. The concentration of the epoxy- and halogen-substituted octahydro-endo,endo-dimethanonaphthalene compound in the solution may vary between about 10 and 60%, although these figures are not critical. The nitrite salt is added to the solution in an amount preferably between about 0.5 and about 5%, based upon the solids content of the solution. The crystallization of the epoxy- and halogen-substituted octahydro-endo,endo-dimethanonaphthalene compound in the presence of the added nitrite salt may be carried out by conventional methods, such as by concentrating the solution through evaporation and cooling the concentrated solution to bring about crystallization. The crystallization, of course, may be carried out either batchwise or continuously.

The amount of nitrite salt incorporated, regardless of the method of incorporation used, generally should be within the range of from about 0.05% to about 15% by weight of the epoxy- and halogen-substituted octahydro-endo,endo-dimethanonaphthalene compound, and preferably is within the range of from about 0.5 to about 5% by weight of the epoxy- and halogen-substituted octahydro - endo,endo - dimethanonaphthalene compound. Where the epoxy- and halogen-substituted octahydro-endo,endo-dimethanonaphthalene compound to be stabilized is technical endrin, and the nitrite salt is a nitrite salt of a secondary amine, there advantageously may be employed about 1% by weight of the nitrite salt based upon the weight of technical endrin.

In a typical case in which endrin was stabilized according to the invention, there was prepared a solution of endrin in benzene containing approximately 20% by weight of endrin. The solution was washed with water, the phases were separated, and the organic phase was filtered through cotton to remove any remaining traces of water. To this solution there was added about 1% by weight of diisopropyl ammonium nitrite based upon the weight of the endrin contained in the solution. The benzene then was removed by evaporation, leaving a solid, mostly crystalline residue consisting of the stabilized technical endrin. A sample of the stabilized endrin was stored at 100° C. in a glass container. The sample was analyzed periodically during the storage at 100° C., utilizing the absorption spectrum in the infrared to determine the content of 1,8,9,10,11,11 - hexachloropentacyclo- (6.2.1.1$^{3,6}$.0$^{2,7}$.0$^{4,10}$)dodecan-5-one. This latter compound is a primary decomposition product of endrin; its concentration in the sample affords a convenient measure of the extent of decomposition of the endrin.

After 18 days storage at 100° C. the endrin stabilized by diisopropyl ammonium nitrate was found to contain 3% by weight of this decomposition product.

For purposes of comparison, a second portion of solid technical endrin was prepared by the same method except that the addition of the nitrite salt was omitted. Upon heating at 100° C. the content of 1,8,9,10,11,11-hexachloropentacyclo(6.2.1.1$^{3,6}$.0$^{2,7}$.0$^{4,10}$)-dodecan-5-one in this unstabilized sample rose to over 70% in 48 hours. Comparison of the two runs shows clearly the improved stabilities that are obtained in accordance with the practice of the invention.

Results similar to those that have been obtained using diisopropyl ammonium nitrite are obtained when other nitrite salts are employed for stabilizing endrin and related epoxy- and halogen-substituted octahydro-endo,endo-dimethanonaphthalene compounds according to the invention. Thus, there may be substituted for the diisopropyl ammonium nitrite used in this particular experiment such other nitrite salts as dicyclohexyl ammonium nitrite, disecondary butyl ammonium nitrite, amyl ammonium nitrite, pyridine nitrite, guanidine nitrite, piperidine nitrite, and mixtures of dicyclohexyl ammonium nitrite and diisopropyl ammonium nitrite.

The nitrite salt may be either normally liquid or normally solid, depending upon the particular salt under consideration, and may be employed in such normal form. The nitrite salt may be employed in the form of a solution in water and/or an organic solvent if desired. But a single nitrite salt may be employed as the stabilizing agent, or there may be employed mixtures of two or more different nitrite salts.

The novel, stable, solid (crystalline) compositions of this invention, consisting essentially of the epoxy- and halogen-substituted octahydro-endo,endo-dimethanonaphthalene compound and the nitrite salt, may be stored with notably greater safety than can the same epoxy- and halogen-substituted octahydro-endo,endo-dimethanonaphthalene compounds in the absence of a stabilizing agent. The new compositions may be employed for the preparation of insecticidal dusts, wettable powders, sprays (which may be simple solutions or may be polyphase compositions, e. g., emulsions) by methods already known for the preparation of insecticidal compositions from these epoxy- and halogen-substituted octahydro-endo,endo-dimethanonaphthalene compounds. The insecticidal compositions prepared from the novel compositions of this invention have notably increased stabilities in compounding, storage, shipment and use. The presence of the nitrite salt has been found to exert no deleterious effect as to insecticidal or other properties.

It will be appreciated that the invention should not be misconstrued as being limited otherwise than as indicated by the appended claims, and that the invention includes all those various specific embodiments which can be practiced by those skilled in the art in view of the disclosures without departure from the invention as defined by the appended claims.

I claim as my invention:

1. A composition of matter consisting essentially of an epoxy- and halogen-substituted octahydro-endo,endo-dimethanonaphthalene compound and as stabilizer therefor a stabilizing minor amount of a non-basic nitrite salt of an unsubstituted dialkyl amine having not more than 32 carbon atoms per molecule.

2. A composition of matter defined by claim 1 in which the epoxy- and halogen-substituted octahydro-endo,endo-dimethanonaphthalene compound is endrin.

3. A composition of matter consisting essentially of crystalline 6,7 - epoxy - 1,2,3,4,10,10 - hexachloro - 1,4, 4a,5,6,7,8,8a - octahydro - 1,4,5,8 - endo,endo - dimethanonaphthalene and occluded within the crystals a minor amount, sufficient to stabilize the 6,7 - epoxy - 1,2,3,4,10, 10 - hexachloro - 1,4,4a,5,6,7,8,8a - octahydro-1,4,5,8-endo,endo - dimethanonaphthalene, of a non-basic nitrite salt of a secondary amine having not more than 32 carbon atoms per molecule wherein the amino nitrogen atom is substituted by a cyclic hydrocarbon group which salt is non-reactive with the oxirane ring.

4. A composition of matter consisting essentially of crystalline 6,7 - epoxy - 1,2,3,4,10,10 - hexachloro - 1,4,4a, 5,6,7,8,8a - octahydro - 1,4,5,8 - endo,endo - dimethanonaphthalene and occluded within the crystals thereof a minor amount, sufficient to stabilize the 6,7-epoxy-1,2,3, 4,10,10 - hexachloro - 1,4,4a,5,6,7,8,8a - octahydro-1,4,5, 8-endo,endo-dimethanonaphthalene, of a non-basic dialkyl ammonium nitrite having not more than 32 carbon atoms per molecule which nitrite is non-reactive with the oxirane ring.

5. A composition of matter consisting essentially of crystalline 6,7 - epoxy - 1,2,3,4,10,10-hexachloro - 1,4,4a, 5,6,7,8,8a - octahydro - 1,4,5,8 - endo,endo - dimethanonaphthalene and occluded within the crystals thereof a minor amount, sufficient to stabilize the 6,7-epoxy-1,2,3, 4,10,10-hexachloro - 1,4,4a,5,6,7,8,8a - octahydro - 1,4,5, 8 - endo,endo - dimethanonaphthalene, of a non-basic dicycloalkyl ammonium nitrite having not more than 32 carbon atoms per molecule which nitrite is non-reactive with the oxirane ring.

6. A composition of matter consisting essentially of crystalline 6,7 - epoxy - 1,2,3,4,10,10 - hexachloro - 1,4,- 4a,5,6,7,8,8a - octahydro - 1,4,5,8 - endo,endo - dimethanonaphthalene and intimately admixed therewith, as stabilizer, from about 0.05% to about 15% by weight of a non-basic nitrite salt of an unsubstituted dialkyl amine having from about 4 to 32 carbon atoms per molecule.

4. A composition of matter consisting essentially of crystalline 6,7 - epoxy - 1,2,3,4,10,10 - hexachloro - 1,4,- 4a,5,6,7,8,8a - octahydro - 1,4,5,8 - endo,endo - dimethanonaphthalene and intimately admixed therewith, as stabilizer, from about 0.05% to about 15% by weight of a non-basic unsubstituted organic ammonium nitrite having not more than 32 carbon atoms per molecule.

8. A composition of matter consisting essentially of crystalline 6,7 - epoxy - 1,2,3,4,10,10 - hexachloro - 1,4,- 4a,5,6,7,8,8a - octahydro - 1,4,5,8 - endo,endo - dimethanonaphthalene and intimately admixed therewith, as stabilizer, from about 0.05% to about 15% by weight of the non-basic salt, diisopropyl ammonium nitrite.

9. A composition of matter consisting essentially of crystalline 6,7 - epoxy - 1,2,3,4,10,10 - hexachloro - 1,4,- 4a,5,6,7,8,8a - octahydro - 1,4,5,8 - endo,endo - dimethanonaphthalene and intimately admixed therewith, as stabilizer, from about 0.05% to about 15% by weight of a non-basic nitrite salt of the group consisting of the nitrite salts of organic amines of not more than 32 carbon atoms per molecule and the lithium, sodium, potassium and alkaline earth metal nitrites which salt is non-reactive with the oxirane ring.

10. A composition of matter consisting essentially of an epoxy- and halogen-substituted octahydro-endo,endo-dimethanonaphthalene compound stabilized with a non-basic nitrite salt of the group consisting of the nitrite salts of organic amines of not more than 32 carbon atoms per molecule and the lithium, sodium, potassium and alkaline earth metal nitrites which salt is non-reactive with the oxirane ring.

11. Endrin stabilized with a non-basic nitrite salt of an organic amine having not more than 32 carbon atoms per molecule which salt is non-reactive with the oxirane ring.

References Cited in the file of this patent
UNITED STATES PATENTS
2,676,132    Bluestone _____ Apr. 20, 1954
OTHER REFERENCES
Agricultural Chemicals 7:67 (September 1952).